Jan. 29, 1946.  H. L. MILLER  2,393,795
FLANGE SPREADER
Filed Sept. 8, 1944
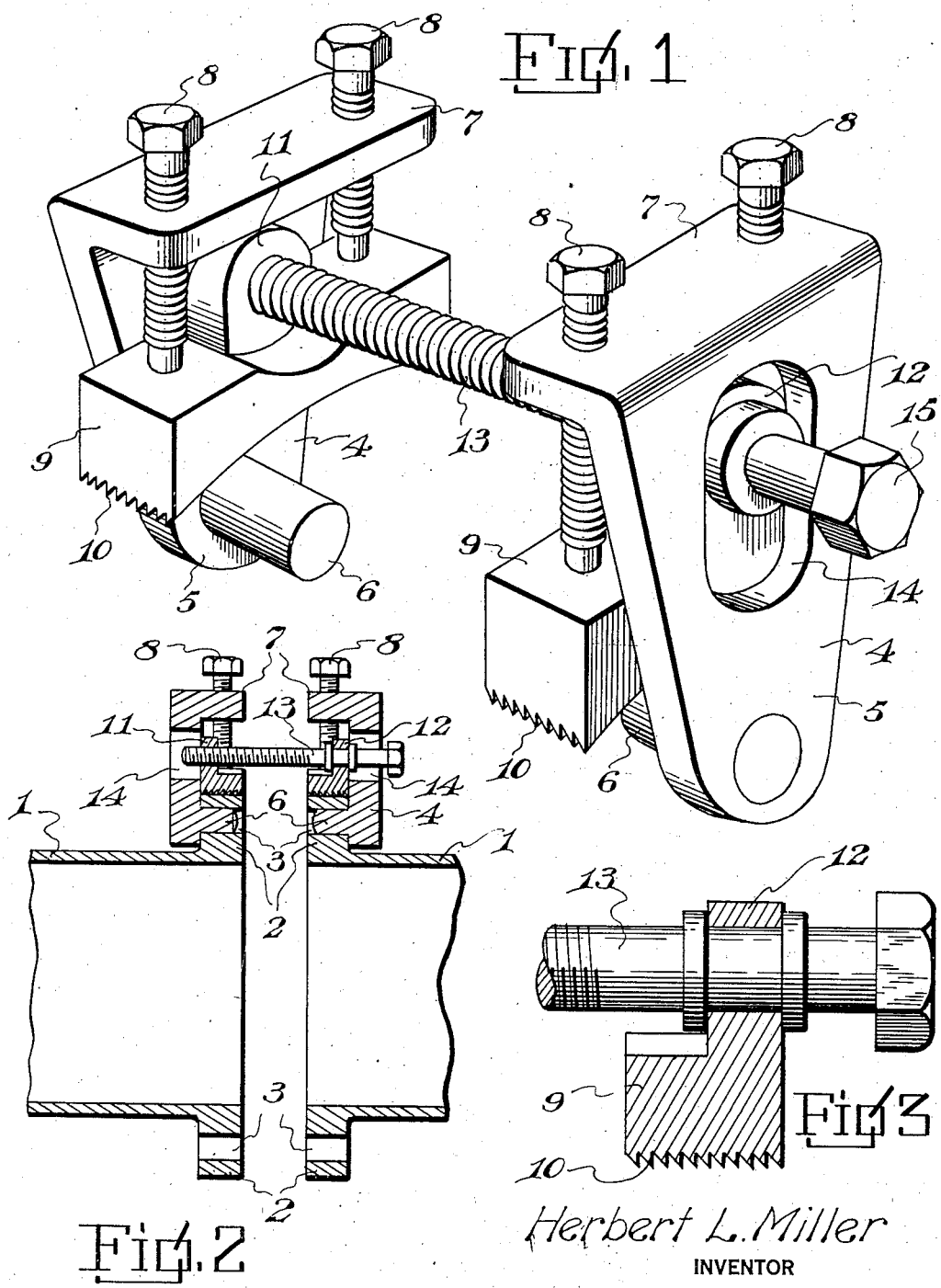
Herbert L. Miller
INVENTOR Patented Jan. 29, 1946

2,393,795

UNITED STATES PATENT OFFICE 2,393,795

FLANGE SPREADER

Herbert L. Miller, Miami, Okla.

Application September 8, 1944, Serial No. 553,258

4 Claims. (Cl. 254—100)

The invention relates to flange spreaders or pullers, particularly adapted for use in spreading flanges of oil pipe lines, and has for its object to provide a device of this kind which can be easily and quickly attached to adjacent pipe flanges and gripping the same so the flanges can be forced apart for repair and cleaning purposes, or for inserting orifice plates when desired.

A further object is to provide a flange spreader or puller comprising members clamped to the adjacent flanges and utilizing lugs disposed in the bolt openings of the flange, and gripping members cooperating with the peripheries of the flanges for positively anchoring the members to the flanges, and a jack screw connecting both members, which jack screw, when rotated in one direction, will force the flanges apart and hold them separated, and when rotated in the opposite direction, will pull the flanges together. The device is so constructed that it will not engage or mar the abutting faces of the flanges.

A further object is to provide a pipe flange spreader comprising L-shaped brackets having lugs adapted to be received in the bolt holes of the flanges, gripping jaws engaging the peripheries of the flanges and clamped thereon by bolts carried by one of the flanges of the L-shaped brackets for positively anchoring the brackets to the flanges and a jack screw connecting said clamping jaws for forcing said flanges apart or pulling the same together as desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the flange spreader.

Figure 2 is a vertical longitudinal sectional view through adjacent pipe ends, showing the flanges spread by the flange spreader.

Figure 3 is a vertical longitudinal sectional view through one of the gripping jaws, showing the pivoted end of the jack screw.

Referring to the drawing, the numeral 1 designates adjacent pipe sections having conventional flanges 2 with bolt apertures 3. In oil pipe lines it is often necessary to spread the pipe sections 1 for cleaning and repair purposes, and for inserting orifice plates. The usual practice is to pry the sections apart, however wedging tools mar the adjacent faces of the flanges, and it is often extremely difficult to properly pack the joint, following such wedging operation.

The flange spreader, one of which is shown, however any number may be used at one time, comprises spaced L-shaped brackets 4, the depending arms 5 of which engage the outer sides of the flange 2, and are provided with inwardly extending lugs 6, which are received in registering bolt apertures 3 of the flanges.

The upper ends of the brackets 4 terminate in inwardly extending flanges 7 through which is threaded clamping screws 8, which extend downwardly against the flange gripping jaws 9, the under sides of the jaws being provided with teeth 10, which bite into the outer peripheries of the flanges 2 when the bolts 8 are tightened, and at which time the lugs 6 are in the bolt apertures 3, hence it will be seen that the brackets and gripping jaws are positively clamped to the flanges for a pushing or pulling operation, and that the adjacent faces of the flanges will not be marred.

Gripping jaws 9 are provided with upwardly extending lugs 11 and 12, and pivotally mounted in the lug 12 is a rotatable jack screw 13, which jack screw is threaded to the lug 11, hence it will be seen that the flanges 2 may be forced apart or pulled together according to the direction of rotation of the jack screw 13. The ends of the jack screw extend through vertically elongated apertures 14 in the bracket members 5, thereby allowing a free movement of the gripping jaws 9, as the device is adjusted in place on the flanges, and clamped thereon. The under sides of the gripping jaws 9 are arcuate shaped on substantially the same radius as the flanges, therefore it will be seen there will be a positive gripping over a large area of the peripheries of the flanges. The jack screw head 15 is preferably smaller than the opening 14 so it may easily pass through the opening 14 during the assembling operation. It is obvious that various sizes of gripping jaws 9 may be used according to the diameter of pipe flanges and various size lugs 6, and applicant does not limit himself in this particular.

From the above it will be seen that a pipe flange spreader is provided which is simple in construction, easily operated, and one which may be easily and quickly attached to the flanges, and there will be no danger of marring the adjacent faces of the flanges during a spreading or drawing operation.

The invention having been set forth, what is claimed as new and useful is:

1. A flange spreading and pulling device comprising brackets engaging the outer sides of adjacent flanges, lugs carried by the brackets and extending into apertures of the flanges from the outer side in, downwardly extending set screws carried by the brackets spaced from the peripheries of the flanges, gripping jaws engaging the peripheries of the flanges, said set screws cooperating with said jaws and lugs for positively clamping the brackets on the flanges and jack screw means for drawing said flanges together.

2. A device as set forth in claim 1 including a bearing in one of the gripping jaws, said jack screw being rotatably mounted in said bearing and threaded through a portion of the other gripping jaw.

3. A device as set forth in claim 1 wherein the set screws for the gripping jaws engage the gripping jaws on opposite sides of the jack screw.

4. A device as set forth in claim 1 wherein the jack screw is rotatably mounted in one of the gripping jaws and threaded through the other gripping jaw, said brackets having elongated apertures, the ends of said jack screw extending through said elongated apertures in the brackets.

HERBERT L. MILLER.